US008176555B1

(12) United States Patent
Schreiner et al.

(10) Patent No.: US 8,176,555 B1
(45) Date of Patent: May 8, 2012

(54) SYSTEMS AND METHODS FOR DETECTING MALICIOUS PROCESSES BY ANALYZING PROCESS NAMES AND PROCESS CHARACTERISTICS

(75) Inventors: Anthony Schreiner, Los Angeles, CA (US); Brian Hernacki, San Carlos, CA (US); Christopher Peterson, Culver City, CA (US); William E. Sobel, Jamul, CA (US); Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1013 days.

(21) Appl. No.: 12/130,812

(22) Filed: May 30, 2008

(51) Int. Cl.
*G06F 21/00* (2006.01)
(52) U.S. Cl. .......................................... 726/23; 726/24
(58) Field of Classification Search ............... 726/22–24
See application file for complete search history.

(56) References Cited

U.S. PATENT DOCUMENTS

| 7,712,132 | B1 * | 5/2010 | Ogilvie ........................... 726/22 |
| 2006/0150256 | A1 * | 7/2006 | Fanton et al. ................... 726/27 |
| 2008/0120319 | A1 * | 5/2008 | Drews et al. ................... 707/102 |
| 2009/0288161 | A1 * | 11/2009 | Wei et al. ......................... 726/22 |

OTHER PUBLICATIONS

Rowe, "Measuring the Effectiveness of Honeypot Counter-Counterdeception", Proceedings of the 39th Hawaii International Conference on System Sciences—2006.*

* cited by examiner

*Primary Examiner* — Kambiz Zand
*Assistant Examiner* — Michael Guirguis
(74) *Attorney, Agent, or Firm* — Advantedge Law Group

(57) ABSTRACT

A computer-implemented method for detecting a malicious process using file-name heuristics may comprise: 1) identifying a process, 2) identifying a process name for the process, 3) identifying a list of process names for non-malicious processes, and 4) determining, by comparing the process name for the process with the list of process names for non-malicious processes, whether to allow the process to execute. A method for maintaining a database containing information about non-malicious processes is also disclosed. Corresponding systems and computer-readable media are also disclosed.

18 Claims, 14 Drawing Sheets

| PROCESS-NAMES INDEX 402 | ACCEPTABLE-LOCATION INDEX 404 |
|---|---|
| egress.exe | C:\Program Files\ |
|  | C:\ |
|  | C:\Users\Achilles\Desktop\ |
| cnax.exe | C:\Program Files\ |
|  | C:\Users\Achilles\Downloads\cnax_3.1\ |
|  | C:\Program Files\cnax_3.1\ |
|  | C:\ |
| mousecon.exe | C:\Drivers\Input\ |
| keyup.exe | C:\Drivers\Input\ |
| modemman.exe | C:\Drivers\Modem\ |
| vidview.exe | C:\Drivers\Video\ |
| pictureman.exe | C:\Users\Achilles\Pictures\ |
|  | C:\Users\Achilles\Documents\ |
| tasker.exe | C:\Windows\System32\ |
| mp3controller.exe | C:\Program Files\Common Files\ |
|  | C:\Program Files\ |
| klrt.exe | C:\ |
| vidwrt.exe | C:\Users\Achilles\Video |
| tortoslide.exe | C:\Users\Achilles\Desktop\ |
| executor.exe | C:\Program Files\Executor\ |
| almclk.exe | C:\Program Files\AlmClk\ |
| sysrun.exe | C:\Windows\System32\ |
| outman.exe | C:\Drivers\Output\ |
| memman.exe | C:\Drivers\Memory\ |
| inman.exe | C:\Drivers\Input\ |
| keycon.exe | C:\Program Files\ |
|  | C:\Program Files\Keycon\ |
|  | C:\Keycon\ |
|  | C:\ |
| textmaster.exe | C:\Program Files\TextMaster\ |
|  | C:\Program Files\ |
|  | C:\TextMaster\ |
|  | C:\ |
|  | C:\Users\Achilles\Desktop\TextMaster\ |
| hawg.exe | C:\Windows\System32\ |
|  | C:\Windows\ |

FIG. 4

1000

| Process 1002 | |
|---|---|
| Process Name: | tortomax.exe |
| Process-Execution Location: | c:\program_files\tortomax\ |
| Acceptable Location: | N/A |
| Closest Known Process Name: | torrent.exe |
| Number of Letter Transformations: | 5 |
| Digital Signature Present: | Yes |
| Process Publisher: | Mandaworks |
| Process 1004 | |
| Process Name: | caio.exe |
| Process-Execution Location: | C:\temp\ |
| Acceptable Location: | No |
| Closest Known Process Name: | caio.exe |
| Number of Letter Transformations: | 0 |
| Digital Signature Present: | No |
| Process Publisher: | N/A |
| Process 1006 | |
| Process Name: | ccttsss.exe |
| Process-Execution Location: | C:\program_files\ccttss |
| Acceptable Location: | N/A |
| Closest Known Process Name: | ccttss.exe |
| Number of Letter Transformations: | 1 |
| Digital Signature Present: | No |
| Process Publisher: | N/A |
| Process 1008 | |
| Process Name: | makemp3.exe |
| Process-Execution Location: | C:\program_files\makemp3 |
| Acceptable Location: | Yes |
| Closest Known Process Name: | makemp3.exe |
| Number of Letter Transformations: | 0 |
| Digital Signature Present: | Yes |
| Process Publisher: | MP3SA |

FIG. 10

| Action-Taken Report for Process 1102 | |
|---|---|
| Process Name: | egress.exe |
| Process Execution Location: | C:\Program Files\egress\ |
| Process Executed: | yes |
| Whitelist Process Name: | yes |
| Whitelist Process Execution Location: | yes |
| Action-Taken Report for Process 1104 | |
| Process Name: | torre.exe |
| Process Execution Location: | C:\temp\ |
| Process Executed: | no |
| Whitelist Process Name: | yes |
| Whitelist Process Execution Location: | no |
| Action-Taken Report for Process 1106 | |
| Process Name: | egresss.exe |
| Process Execution Location: | C:\Program Files\egress\ |
| Process Executed: | no |
| Whitelist Process Name: | no |
| Whitelist Process Execution Location: | N/A |

FIG. 11

SYSTEMS AND METHODS FOR DETECTING MALICIOUS PROCESSES BY ANALYZING PROCESS NAMES AND PROCESS CHARACTERISTICS

BACKGROUND

Malicious programmers are constantly attempting to exploit computing systems by creating malicious software programs (malware), such as viruses, worms, and Trojan horses. In some situations, malicious programmers may try to hide malware on computing systems so that it will be overlooked or ignored by computer security programs. For example, malicious programmers may name a malicious process using a name that is confusingly similar to the name of a non-malicious process. For instance, a developer may name a malicious process "egresss.exe," which may be confusingly similar to a non-malicious process named "egress.exe." In this example, the malicious programmer may fool a user or security program into allowing the malicious process to execute since the name of the malicious process only differs from the name of the non-malicious process by a single letter.

In another example, a malicious programmer may name a malicious process using the same name as a non-malicious process, but may cause the malicious process to run from an unexpected file location. For example, a malicious programmer may cause the process "egress.exe" to execute from the file location "C:\temp\" instead of the expected execution location "C:\program files\egress\". In this example, the malicious programmer may fool a user or a security program into allowing the malicious process to run since the malicious process uses the same name as the non-malicious process, even though the malicious process may execute from a file location that is different from the non-malicious process.

SUMMARY

As will be described in greater detail below, embodiments of the instant disclosure may provide computing systems with the ability to identify malicious processes by analyzing process names and execution locations. Additional embodiments for identifying malicious processes by analyzing process names and execution locations are also disclosed.

In at least one embodiment, security software may utilize an enforcer and a list manager to detect and prevent malicious software from executing. The enforcer may identify processes and communicate with the list manager to ascertain whether the processes are malicious. If a process is found to be malicious, then the enforcer may prevent the process from running.

The list manager may maintain a database of process names for non-malicious processes. In certain embodiments, the list manager may organize the data into two categories. The first category may organize the data by process name into a process-names index. The second category may organize the data by process-execution location into an acceptable-location index. For example, a known non-malicious process may have the name "mosdriv.exe" and may execute from the file location "C:\program_files\mosdriv\." In this example, the list manager may place the name "mosdriv.exe" in the process-names index of the database. The list manager may then place the location "C:\programfiles\mosdriv\" in the acceptable-location index of the database. The list manager may also update the database as new non-malicious processes are discovered.

The enforcer may determine whether to allow new processes to execute. In certain embodiments, the enforcer determines when a new process is about to execute on the computing system. The enforcer may then identify certain characteristics about the process. For example, the enforcer may identify a process name "mosdriv.exe" and the process-execution location "C:\program_files\mosdriv\" for the process name. The enforcer may then communicate with the list-manager to determine whether the new process is malicious.

For example, the enforcer may compare the process name with the non-malicious process names contained in the process-names index in an attempt to identify an exact or inexact match. The enforcer may identify an inexact match when the process name differs from a non-malicious name found in the process-names index by a small number of letter transformations. For example, the enforcer may determine that the process "mosdrive.exe" differs from the process "mosdriv.exe" contained in the process-names index by only one letter transformation: the addition or deletion of the letter "e."

If an exact match is identified (i.e., a match in which the process names are exactly the same), the enforcer may compare the process-execution location for the process with the acceptable-process-execution locations associated with the process name in the acceptable-location index in the database. The enforcer may then determine whether to allow or deny process execution based on the information derived from these comparisons.

The computing system may automatically determine whether to allow a process to execute or it may prompt a user of the computing system to manually determine whether to allow the process to execute. During an automatic determination, the computing system may determine whether to allow a process to execute by comparing characteristics of the process with information contained in the database maintained by the list manager. For example, if an inexact match is found, the computing system may prevent the process from executing since the process may likely represent malicious software mimicking the name of non-malicious software.

The computing system may also prevent a process that has a process name that is identical to a process name in the process-names index from executing if the process attempts to execute from a location that is not contained in the acceptable-location index associated with its process name. The computing system may also check any digital signatures associated with the process and add processes associated with trusted digital signatures to the database maintained by the list manager.

In certain embodiments, the computing system may prompt the user to determine whether the process may execute. For example, the computing system may display process characteristics that may aid a user in making such a determination. In particular, the computing system may display the number of letter transformations performed on the process name, the process name, and the process-execution location. The computing system may then prompt the user to verify if the process should be allowed to execute. The computing system may also prompt the user to determine whether the process name and process-execution location should be added to the database maintained by the list-manager.

A server and client-computing system may communicate over a network in order to implement the enforcer and list-manager relationship described above. In certain embodiments, the client-side enforcer identifies a new process. The client-side enforcer may transmit process information to the list-manager on the server. The server may compare the process information with the database maintained by the list-manager. The server may transmit the results of the comparison back to the client-side computing system, where the client-side enforcer may determine, either manually or automatically, whether to allow the process to execute.

In a further embodiment, the client-side computing system identifies the process and transmits process-information to the server. The server may then determine whether to allow the process to execute and transmit the results of such a determination back to the client-side computing system. The client-side computing system may act on the server's determination.

Systems and computer-readable media corresponding to the above methods are disclosed herein. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram illustrating the contents of a list of process names for non-malicious processes according to at least one embodiment.

FIG. 10 is a block diagram illustrating the contents of an action-taken report according to at least one embodiment.

FIG. 11 is a block diagram illustrating the data that a computing system may use to automatically determine whether to allow a process to execute according to at least one embodiment.

Figure 1:
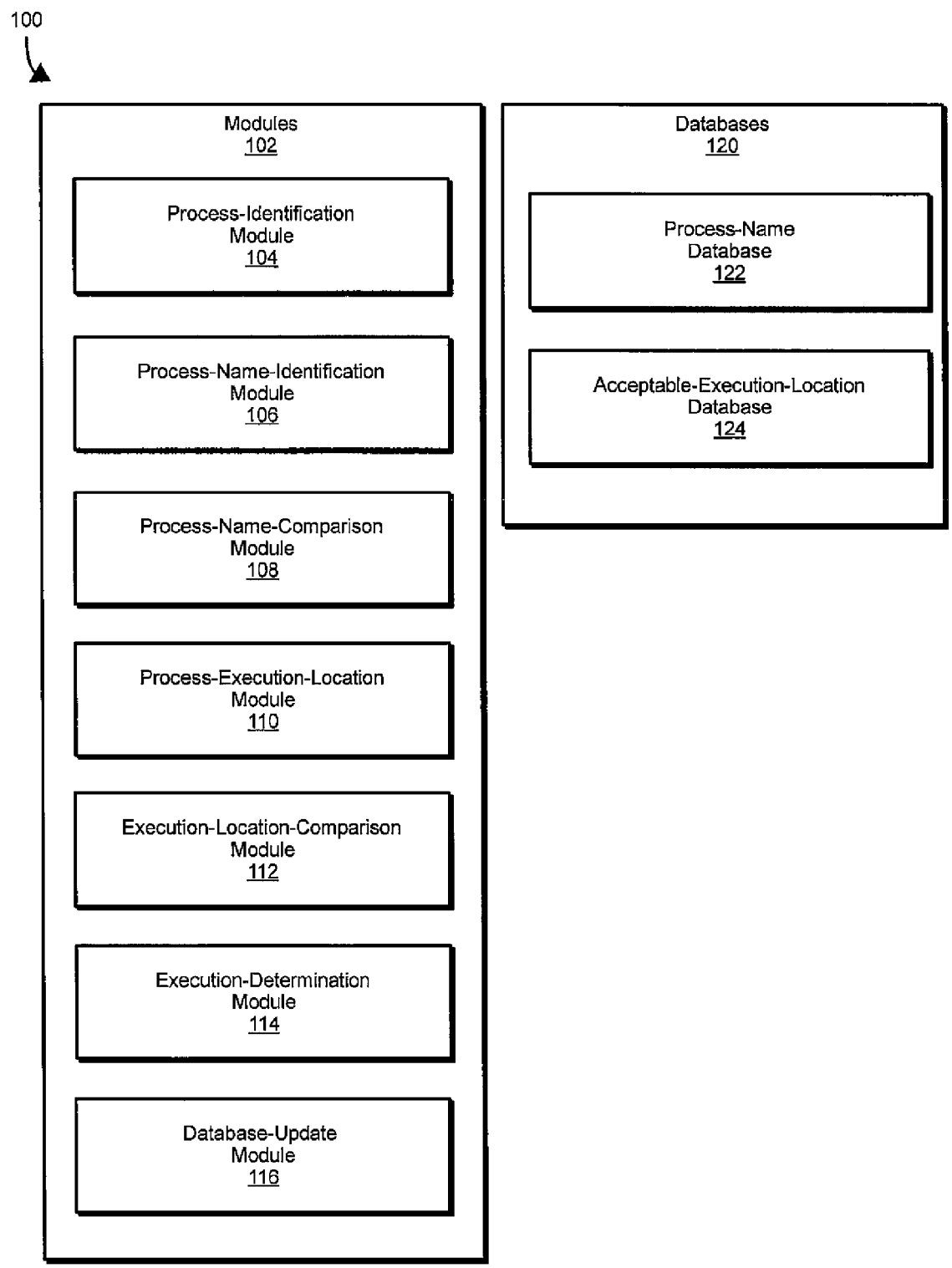
FIG. 1 is a block diagram of an exemplary system for detecting a malicious process by analyzing process names and process-execution locations according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for detecting malicious processes by analyzing process names and process-execution locations. Systems and methods for maintaining a list of non-malicious processes and their characteristics are also disclosed. As detailed below, in certain embodiments a computing system can detect malicious software by detecting new processes and their characteristics and searching a list of non-malicious processes for the name of the new process and its characteristics.

Figure 2:
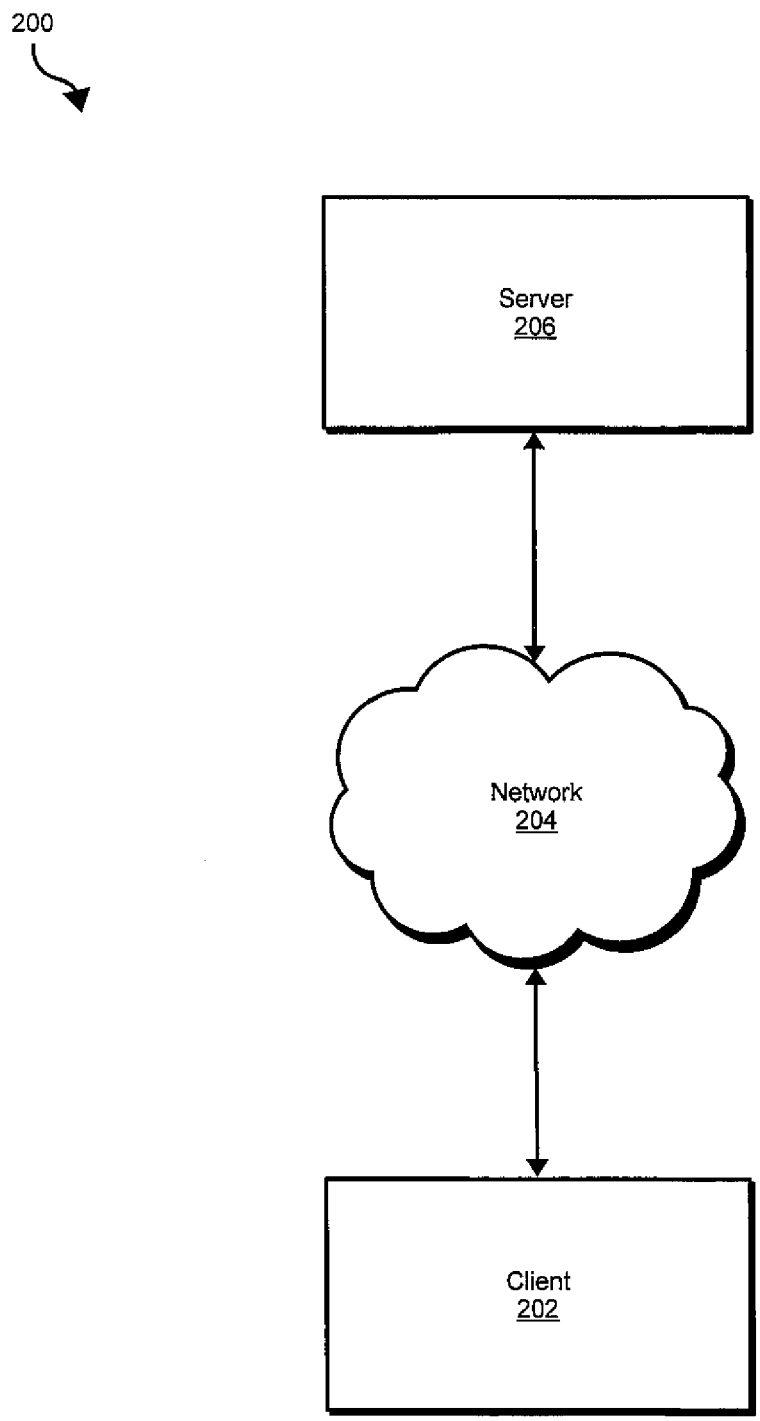
FIG. 2 is a block diagram of an exemplary network-based system for detecting a malicious process by analyzing process names and process-execution locations according to at least one embodiment.

The following will provide, with reference to FIGS. 1 and 2, detailed descriptions of exemplary systems for: 1) detecting a malicious process by process name and process-execution location and 2) maintaining a list of non-malicious processes and their characteristics. An illustration of the manner in which process information may be maintained in the list of non-malicious processes is provided in FIG. 4. An illustration of results that may be used to determine whether a process name matches a known non-malicious process name is provided in FIG. 5. An illustration of the data that may be used by the client-computing system to determine whether to allow the process to execute is provided in FIG. 10. An illustration of the actions taken by a client-computing system in determining whether to allow a process to execute is provided in FIG. 11. Descriptions of exemplary user interfaces for determining whether to allow a process to execute are provided in FIGS. 8 and 9. Detailed descriptions of corresponding exemplary computer-implemented methods will also be provided in connection with FIGS. 3, 6, 7, and 12.

FIG. 1 is a block diagram of an exemplary system 100 for detecting malicious processes by analyzing process names and process characteristics. As illustrated in this figure, exemplary system 100 may comprise one or more modules 102 for performing one or more tasks. For example, exemplary system 100 may comprise a process-identification module 104 for detecting executable files that are attempting to execute and a process-name-identification module 106 for identifying the process names of the files that are attempting to execute.

Exemplary system 100 in FIG. 1 may also comprise a process-name-comparison module 108 for comparing the process names of the files attempting to execute with a list of known non-malicious process names. In addition, as will be described in greater detail below, exemplary system 100 may comprise a process-execution-location module 110 for determining the file location from which the new process is attempting to execute. In addition, exemplary system 100 may comprise an execution-location-comparison module 112 for comparing process-execution locations.

Exemplary system 100 in FIG. 1 may also comprise an execution-determination module 114 for determining whether to allow the process to execute. In addition, exemplary system 100 may comprise a database-update module 116 for adding processes and their corresponding characteristics to the list of known non-malicious processes.

As illustrated in FIG. 1, exemplary system 100 may also comprise one or more databases 120. For example, exemplary system 100 may comprise a process-name database 122 for storing the names of non-malicious processes and storing any non-malicious processes added by the database-update module 116. Exemplary system 100 may also comprise an acceptable-execution-location database 124 for storing file locations from which a known process may acceptably execute. Although illustrated as separate devices, one or more of databases 120 may represent portions of a single database or a single computing device.

In certain embodiments, one or more of modules 102 in FIG. 1 may represent one or more software applications or programs that, when executed by a computing device, may cause the computing device to perform one or more tasks required to detect malicious processes by analyzing process names and process characteristics. For example, as will be described in greater detail below, one or more of modules 102 may represent software modules configured to run on one or more computing devices, such as client 202 in FIG. 2, server 206 in FIG. 2, computing system 1310 in FIG. 13, and/or portions of exemplary network architecture 1400 in FIG. 14. One or more of modules 102 in FIG. 1 may also represent all or portions of one or more special-purpose computers configured to perform one or more tasks required to detect malicious processes by analyzing process names and process characteristics.

In addition, one or more of databases 120 in FIG. 1 may represent a portion of one or more computing devices. For example, one or more of databases 120 may represent a portion of client 202 in FIG. 2, server 206 in FIG. 2, exemplary computing system 1310 in FIG. 13, and/or portions of exemplary network architecture 1400 in FIG. 14. Alternatively, one or more of databases 120 in FIG. 1 may represent one or more physically separate devices capable of being accessed by a computing device, such as client 202 in FIG. 2, server 206 in FIG. 2, computing system 1310 in FIG. 13, and/or portions of exemplary network architecture 1400 in FIG. 14.

Client 202 in FIG. 2 generally represents any type or form of client-side computing device capable of executing computer-readable instructions. In certain embodiments, client 202 may comprise one or more portions of exemplary system 100 in FIG. 1. For example, one or more of modules 102 may be stored and configured to run on client 202 in FIG. 2. Similarly, one or more of databases 120 in FIG. 1 may represent portions of client 202 in FIG. 2.

In at least one embodiment, client 202 in FIG. 2 may communicate with server 206 via network 204. Network 204 generally represents any type or form of communication or computing network; including, for example, an intranet, a wide area network (WAN), a local area network (LAN), a personal area network (PAN), or the Internet.

As illustrated in FIG. 2, exemplary system 200 may also comprise a server 206. Server 206 generally represents any type or form of server-side computing device, such as a back-end. In certain embodiments, server 206 may comprise one or more portions of exemplary system 100 in FIG. 1. For example, one or more of modules 102 from FIG. 1 may be stored and configured to run on server 206 in FIG. 2. Similarly, server 206 may comprise one or more of databases 120 in FIG. 1.

Figure 3:
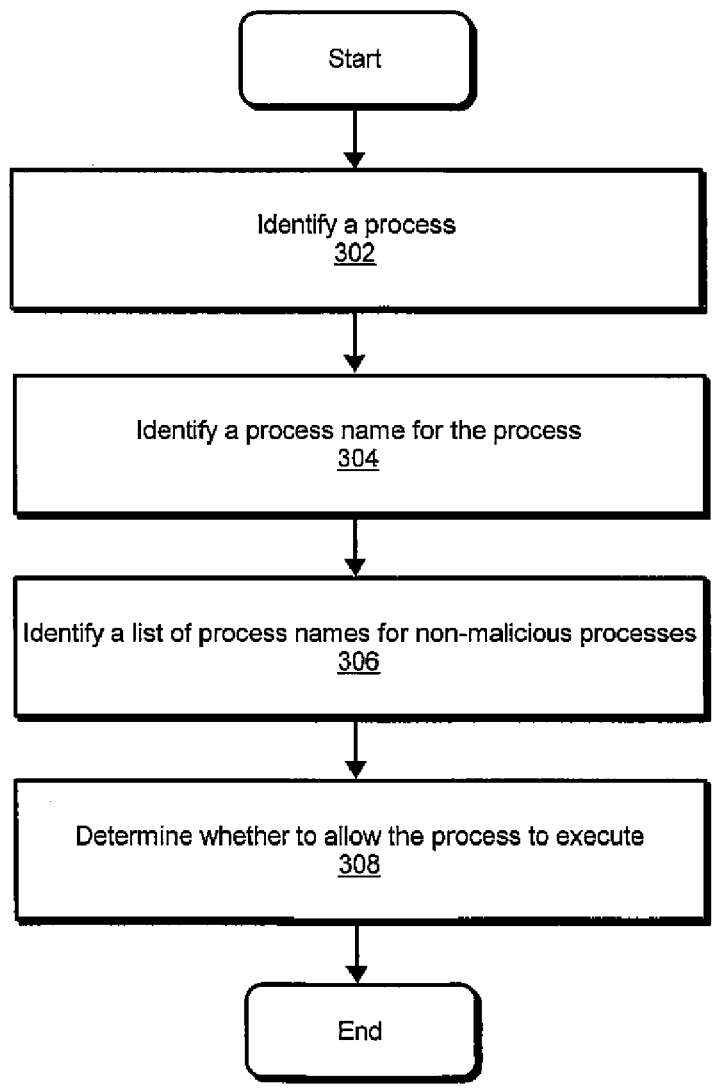
FIG. 3 is a flow diagram of an exemplary computer-implemented method for determining whether to allow a process to execute by process name according to at least one embodiment.

FIG. 3 is a flow diagram of an exemplary computer-implemented method 300 for identifying a process, a process name, and then determining if the process is malicious by comparing the process name with an identified list of process names for non-malicious processes. As illustrated in this figure, at step 302 a process may be identified. For example, process-identification module 104 in FIG. 1 may identify a process that is attempting to execute on client 202 in FIG. 2.

A process that is attempting to execute may be identified in a variety of ways. For example, process-identification module 104 in FIG. 1 may identify processes when instructions associated with an executable file that is not currently executing commence execution. In another example, process-identification module 104 may identify a process when a user of client 202 in FIG. 2 selects an executable file in an attempt to allow the process to execute. In these examples, the process-identification module identifies a process upon execution or immediately before execution.

Processes may also be identified before they begin executing. For example, process-identification module 104 in FIG. 1 may identify an executable file at the moment it is stored on a computing system. Alternatively, process-identification module 104 may periodically scan the computing system for new executable files that have been stored on the computing system.

At step 304 in FIG. 3, a name for the process identified in step 302 may be identified. For example, process-name-identification module 106 in FIG. 1 may identify the name of a process that is attempting to execute on client 202 in FIG. 2. The name may be identified concurrently with the identification of the process in step 302 in FIG. 3. Alternatively, process-name-identification module 106 in FIG. 1 may identify the process name at a separate time than when process-identification module 104 identifies the process.

At step 306 in FIG. 3, a list of process names for non-malicious processes may be identified. For example, process-name database 122 in FIG. 1 may contain a list of process names for non-malicious processes that may exist on either client 202 in FIG. 2 or server 206 in FIG. 2. As will be explained below, the list of process names for non-malicious processes may be used to determine whether the process identified by the process-identification module 104 in FIG. 1 is malicious.

The phrase "list of process names for non-malicious processes," as used herein, generally refers to a database that may organize process information for non-malicious processes. In certain embodiments, this database may contain the process-name database 122 and the acceptable-execution-location database 124 in FIG. 1. FIG. 4 provides an illustration of an exemplary list of process names for non-malicious processes 400 for a computing system. As illustrated in this figure, this list of process names for non-malicious processes 400 may comprise a process-names index 402 that identifies the process names for non-malicious processes and an acceptable-location index 404 that identifies one or more file locations from which a process may acceptably execute. For example, the process name "egress.exe" may represent a non-malicious process in process-names index 402. For this example, "egress.exe" has three corresponding execution locations in the acceptable-location index 404: C:\Program Files\, C:\, and C:\Users\Achilles\Desktop.

The list of process names for non-malicious processes may exist on either client 202 or server 206 in FIG. 2. Portions of the list may exist on both client 202 and server 206. For example, client 202 may contain only the names of processes that have executed on the client computing system. Server 206 may contain a more expansive list of processes that is gathered from a plurality of computing systems. When a new process attempts to execute, client 202 may compare the process name identified in step 304 in FIG. 3 with the list maintained on the client-side computing system. If the name is not found in the list of process names for non-malicious processes, client 202 in FIG. 2 may communicate with server 206 and compare the process name with the list of process names for non-malicious processes maintained on server 206.

In step 308 in FIG. 3, a determination of whether to allow the process to execute may be made using the process name identified in step 304. Step 304 may be performed in a variety of ways. For example, process-name-comparison module 108 in FIG. 1 may determine the logical distance between the process name identified in step 304 in FIG. 3 and one or more of the non-malicious process names in the process-names index 402 in FIG. 4.

Figure 5:
FIG. 5 is a block diagram illustrating the identification of a process name as an exact match, an inexact match, or a non-match according to at least one embodiment.

The term "logical distance," as used herein, generally refers to a calculable similarity metric between an identified process name of a process that is attempting to execute and a known non-malicious process name. FIG. 5 provides an illustration of a matching-transformation table 502. As illustrated in this figure, a computing system may calculate the number of transformations (i.e., the number of letters that must be changed in a first word or phrase to be identical to a second word or phrase) from one process name to another process name. The number of transformations may be a similarity metric that can be used to identify an exact match 506, an inexact match 508, or a non-match 510.

Examples of information that may be used to calculate a distance in matching-transformation table 502 in FIG. 5 include, without limitation, at least one known non-malicious process name (such as egress.exe), a pre-defined transformation threshold 504 (such as two), and at least one identified process name for a process that is attempting to execute (such as egress.exe, egresss.exe or torre.exe). Matching-transformation table 502 may use this information to determine whether the identified process name is an exact match 506, an inexact match 508, or a non-match 510 using any algorithm or heuristic, including, for example, the Levenshtein algorithm.

The phrase "transformation threshold," as used herein, generally refers to a number that establishes an inexact-match-metric range. Similarity metrics which fall within the inexact-match-metric range may qualify as inexact matches. For example, transformation threshold 504 in FIG. 5 may establish an inexact-match-metric range where process names with similarity metrics of one or two qualify as inexact-matches.

For example, the Levenshtein algorithm may be used in matching-transformation table 502 in FIG. 5 to calculate the minimum number of operations needed to transform one process name into another process name. Examples of such operations include, without limitation, the insertion of a character, the deletion of a character, or the substitution of a character. For example, the process name "egress.exe" may qualify as an exact match 506, because zero letter transformations are necessary to transform the process name "egress.exe" into the known non-malicious process name "egress.exe." In another example, the process name "egresss.exe" may qualify as an inexact match 508 because one letter transformation (the deletion of the letter "s"), is required to transform the process name into the non-malicious process name "egress.exe," and one letter transformation falls within the inexact match-metric range established by transformation threshold 504. In a further example, the process name "torre.exe" may qualify as a non-match 510 because five letter transformations are required to change the process name "torre.exe" into the non-malicious process name "egress.exe," and five letter transformations does not fall within the inexact-match range established by transformation threshold 504.

As detailed above, process names can be compared using any number of algorithms, methods, or heuristics. The Damerau-Levenshtein algorithm is similar to the Levenshtein algorithm but includes the transposition of two characters among its set of calculated operations. For example, transforming the process name from "trore.exe" to "torre.exe" would count as only one letter transformation. In another embodiment, the Jaro-Winkler algorithm may be used to calculate a normalized measure of similarity between two process names where 0 indicates no similarity and 1 indicates an exact match. In this example, an inexact-match range would be less than 1 but greater than a defined number between 0 and 1.

In one embodiment, the computing system determines whether a process name is an exact match 506 in FIG. 5, an inexact match 508, or a non-match 510. An inexact match 508 may indicate that the process is malicious. The computing system may not allow the malicious process to execute on client 202 in FIG. 2 unless it determines through another source that the process is non-malicious. A non-match 510 in FIG. 5 may indicate that the process is new to the computing system and further verification may be necessary before the process is added to the process-name database 122 in FIG. 1. Also, if the process is an exact match, the computing system may allow the process to execute on client 202 in FIG. 2 unless the process is attempting to execute from an unexpected file location.

Figure 6:
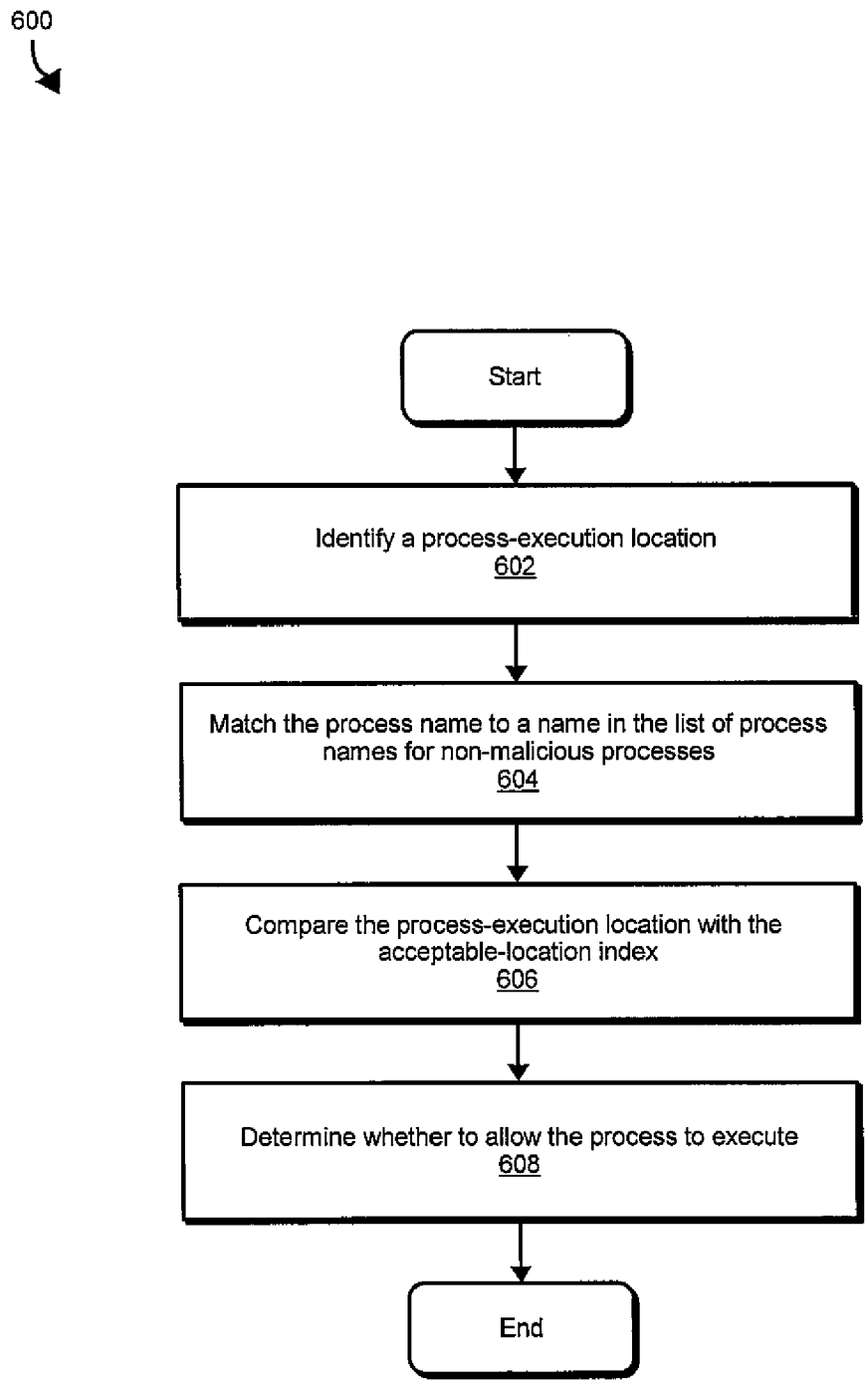
FIG. 6 is a flow diagram of an exemplary computer-implemented method for determining whether to allow a process to execute by process-execution location according to at least one embodiment.

FIG. 6 is a flow diagram of an exemplary computer-implemented method 600 for determining whether a process should execute based on process-execution location. As illustrated in this figure, at step 602 a process-execution location may be identified. For example, when process-name-comparison module 108 in FIG. 1 establishes that the process name identified by the process-name-identification module is an exact match, process-execution-location module 110 may identify a file location on client 202 in FIG. 2 from which the process is attempting to execute.

The phrase "process-execution location," as used herein, generally refers to a file location from which a process is attempting to execute. In certain embodiments, process-identification module 104 in FIG. 1 will identify a process that is attempting to execute at a particular file location on client 202 in FIG. 2. For example, the file "cnax.exe" in process-names index 402 in FIG. 4 may attempt to execute at a process-execution location with the path name of "C:\Program Files\cnax_3.1".

Step 602 in FIG. 6 may be performed in a variety of ways. For example, process-execution-location module 110 in FIG. 1 may identify the process-execution location for the new process at the time the process is attempting to execute. In another embodiment, process-execution-location module 110 may identify the process-execution location for the new module at the time the file containing the executable code is stored on client 202 in FIG. 2.

At step 604 in FIG. 6, the process name may be matched to a non-malicious process name in the list of process names for non-malicious processes. For example, process-name-comparison module 108 in FIG. 1 may find an exact match for the process name in process-name database 122. The exact match may be discovered when the process name is identified by the process-name-identification module 106 and at least one process name in the process-name database 122 is identical.

When using the Levenshtein and Damerau-Levenshtein algorithms, the process names are identical when they have a similarity metric of zero. When using the Jaro-Winkler algorithm, the process names may be identical when they have a similarity metric of one.

At step 606 in FIG. 6, the process-execution location identified may be compared with a file location associated with the process name in the acceptable-location index. For example, execution-location-comparison module 112 in FIG. 1 may compare the process-execution location identified by process-execution-location module 110 with the process-execution locations stored in acceptable-execution-location database 124 that is associated with the process name identified by process-name-identification module 106 stored in process-name database 122.

At step 608 in FIG. 6, a determination of whether to allow the process to execute may be made. For example, the computing system may verify that the process-execution location identified by process-execution-location module 110 in FIG. 1 is found in acceptable-execution-location database 124. The computing system may also verify that the process name identified by process-name-identification module 106 is found in process-name database 122 and is associated with the process-execution location found in acceptable-execution-location database 124. An illustration of such a determination is provided in FIG. 4. In this example, each process-execution location in acceptable-location index 404 may be associated with a process name in process-names index 402. If a process name is found in process-names index 402, the computing system may verify that the process-execution location is acceptable by verifying that the process-execution location identified by process-execution-location module 110 in FIG. 1 in step 602 in FIG. 6 is found in the acceptable-location index 404 associated with the process name. If the process-execution location is verified, then the process may be allowed to execute.

Figure 7:
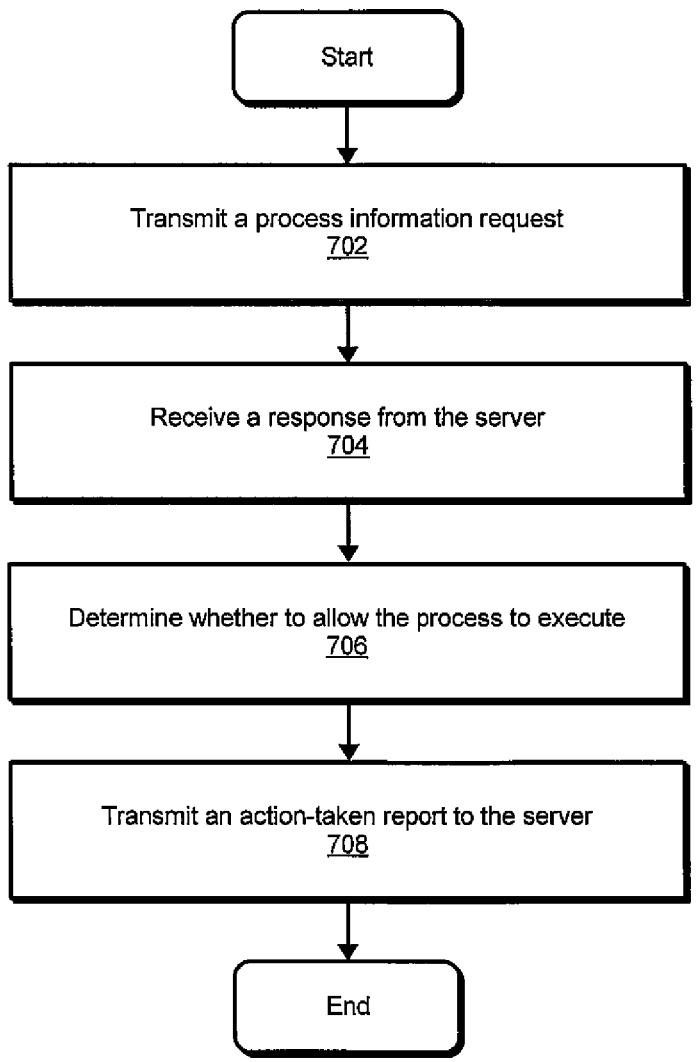
FIG. 7 is a flow diagram of an exemplary computer-implemented method for obtaining and transmitting information to a server that may be used to determine whether to allow a process to execute according to at least one embodiment.

As will be described in greater detail below, the computer-implemented methods described herein for detecting malicious processes by analyzing process names and process characteristics can be implemented through communications between client 202 and server 206 in FIG. 2. FIG. 7 is a flow diagram of an exemplary computer-implemented method 700 in which client 202 in FIG. 2 may communicate process-information to server 206 to determine whether to allow a process to execute. As illustrated in this figure, at step 702 in FIG. 7 a process-information request may be transmitted. For example, client 202 in FIG. 2 may transmit a process-information request to server 206.

The phrase "process-information request," as used herein, generally refers to any data that can be communicated to a server that can be used to identify a process. Examples of communicable data include, without limitation, a process name, a process-execution location, a digital signature associated with the process, or any other potentially useful information.

At step 704 in FIG. 7, a response from the server may be received. For example, client 202 in FIG. 2 may receive a response to the process-information request in step 702 from server 206. This response may contain information that may be useful in helping client 202 determine, either automatically or by prompting the user, whether to allow the process to execute. Examples of information that may aid client 202 in determining whether to allow the process to execute include, without limitation, a process name, a process-execution location, whether the process-execution location is encountered in acceptable-execution-location database 124 in FIG. 1, a process name found in process-name database 122 that is most similar to the process name identified by process-name identification module 106, a similarity metric, the presence of a digital publisher, and the publisher of the process.

At step 706 in FIG. 7, a determination of whether to allow the process to execute may be made. For example, execution-determination module 114 in FIG. 1 may use the information received from server 206 in FIG. 2 to determine whether to allow the process to execute. Client 202 may determine, from the response received from server 206, whether to prompt the user to determine whether to allow the process to execute or whether to automatically determine whether to allow the process to execute.

Figure 8:
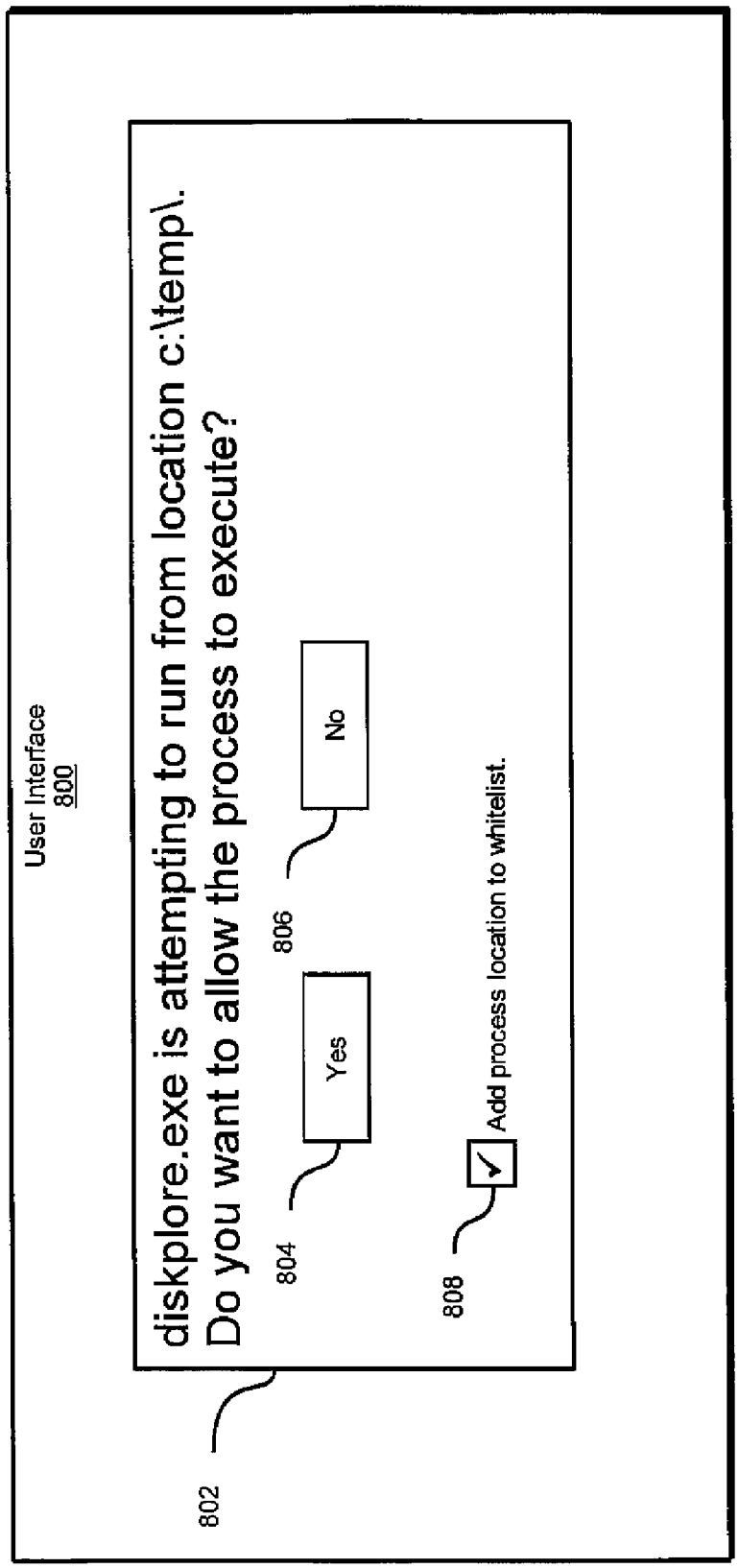
FIG. 8 is a block diagram of an exemplary user interface for determining whether to allow a process to execute based on the process-execution location according to at least one embodiment.
Figure 9:
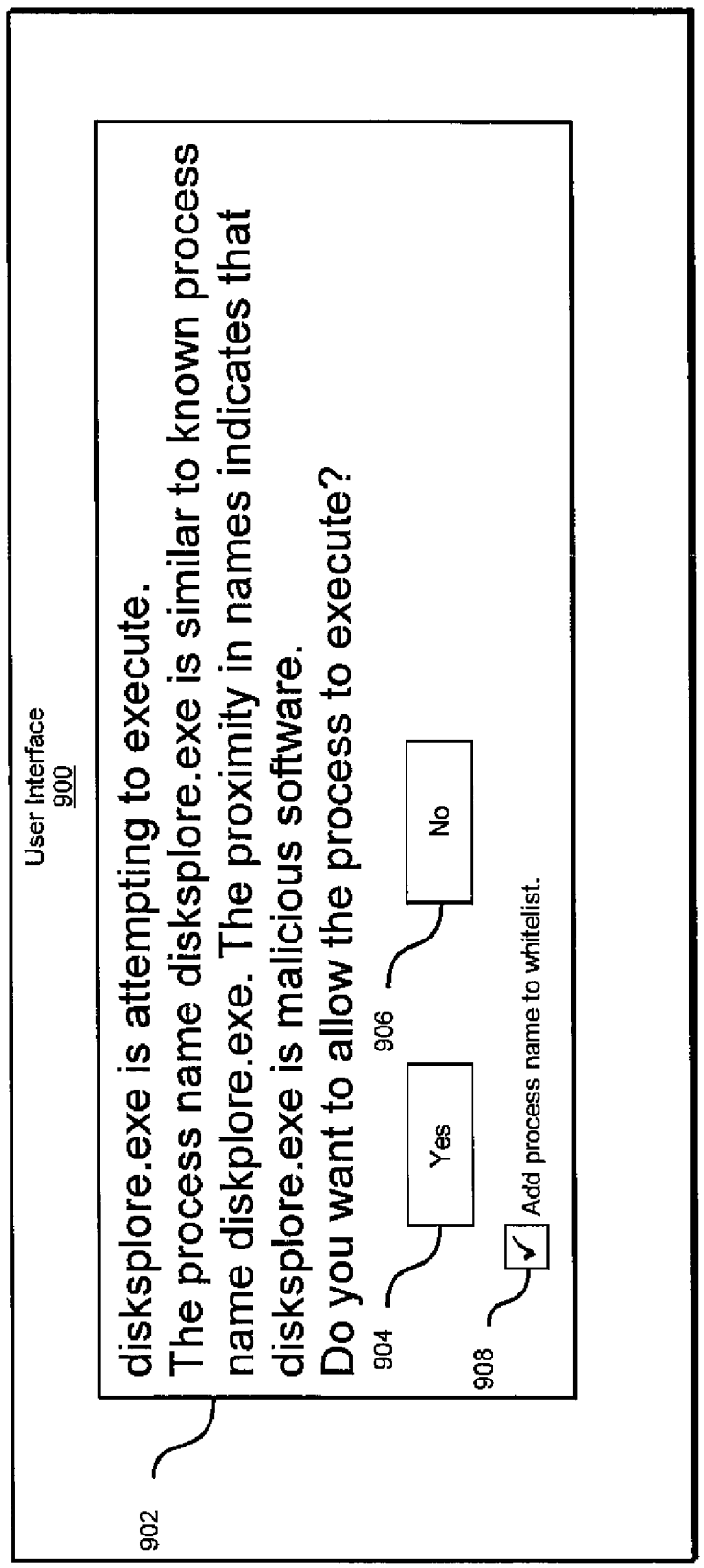
FIG. 9 is a block diagram of an exemplary user interface for determining whether to allow a process to execute based on the process name according to at least one embodiment.

Examples of possible user interfaces that prompt the user to determine whether to allow the process to execute are provided in FIGS. 8 and 9. FIG. 8 is a block diagram of an exemplary user interface 800 for prompting a user to determine whether to allow a process to execute based on a process-execution location. As illustrated, user interface 800 may comprise an explanatory textbox 802 and one or more user-selectable objects 804, 806, and 808. In one embodiment, explanatory textbox 802 may display important information, based on the process-execution location, that may aid the user in making a determination. For example, explanatory textbox 802 may display a process-execution location for a process, a suggestion as to whether a process is malicious, and a process name. Explanatory textbox 802 may prompt the user to determine whether to allow the process to execute.

After reviewing the process-execution location information in explanatory textbox 802, a user may allow the process to execute on client 202 in FIG. 2 by selecting user-selectable object 804 in FIG. 8. Alternatively, if the user wishes to prevent the process from executing, then the user may select user-selectable object 806. In addition, if the user wishes to recommend to the server that the process-execution location be added to the acceptable-execution-location database 124 in FIG. 1, the user may select user-selectable object 808 in FIG. 8.

FIG. 9 is a block diagram of an exemplary user interface 900 for prompting a user to determine whether to allow a process to execute based on a process name. As illustrated, user interface 900 may comprise an explanatory textbox 902 and one or more user-selectable objects 904, 906, and 908. In one embodiment, explanatory textbox 902 may display important information, based on the process name, to aid the user to make a determination. For example, explanatory textbox 902 may display a process name, a process name for a known non-malicious process that is most similar to the process name that is attempting to execute, a suggestion as to whether a process is malicious, and any other information that may aid the user in determining whether to allow the process to execute.

After reviewing the process-name information in explanatory textbox 902, a user may allow the process to execute on client 202 in FIG. 2 by selecting user-selectable object 904 in FIG. 9. Alternatively, if the user wishes to prevent the process from executing, then the user may select user-selectable object 906. In addition, if the user wishes to recommend to the server that the process name be added to the process-name database 122 in FIG. 1, the user may select user-selectable object 908 in FIG. 9.

User interfaces 800 in FIGS. 8 and 900 in FIG. 9 generally represent any type or form of user interface. Examples of user interface 800 and 900 include, without limitation, a graphical user interface executed by a client-side computing device, such as client 202 in FIG. 2, a website hosted by a server-side computing device, such as server 206, or any other suitable user interface.

Returning to FIG. 7, in certain embodiments step 706 in FIG. 7 may be automatically performed by a module, such as execution-determination module 114 in FIG. 1 stored on a user's computing device, or client 202 in FIG. 2. In this embodiment, execution-determination module 114 in FIG. 1 may determine based on information received from server 206 in FIG. 2, whether to allow the process to execute. FIG. 10 is a block diagram that illustrates possible responses from server 206 in FIG. 2 for several different processes. In this example, FIG. 10 may illustrate responses that may be received from server 206 in FIG. 2 for processes 1002, 1004, 1006, and 1008. Each process may be responded to differently by execution-determination module 114 in FIG. 1 on client 202 in FIG. 2.

In one embodiment, process 1002 in FIG. 10 represents a process that was not present in process-name database 122 in FIG. 1. Execution-determination module 114 on client 202 in FIG. 2 may allow the process to execute based on the digital signature that accompanies the process. In another embodiment, process 1004 in FIG. 10 represents a process that was identified by process-name-comparison module 108 in FIG. 1 to be within process-name database 122. In this example, execution-location-comparison module 112 may have been unable to locate the process-execution-location (C:\temp\) for the process within the acceptable-execution-location database 124 associated with the process name (caio.exe). Thus, execution-determination module 114 on client 202 in FIG. 2 may automatically deny the process' attempt to execute.

In a further embodiment, process 1006 in FIG. 10 represents a process that was identified by process-name-comparison module 108 in FIG. 1 as being an inexact match. Since for example, process-name comparison module 108 may determine that the process name (ccttsss.exe) differs from the known non-malicious process name (ccttss.exe) found in process-name database 122 by a similarity metric of one letter transformation. Thus, execution-determination module 114 on client 202 in FIG. 2 may automatically deny the process' attempt to execute. In an additional embodiment, process 1008 in FIG. 10 represents a process that was located in the process-name database 122 in FIG. 1 by process-name-comparison module 108 and located in the acceptable-execution-location database 124 by execution-location-comparison module 112. In this case, execution-determination module 114 on client 202 in FIG. 2 may automatically allow the process to execute.

In additional embodiments, execution-determination module 114 in FIG. 1 may reside on server 206 in FIG. 2. Server 206 may automatically send to client 202, as a response to the process-information request in step 702 in FIG. 7, an instruction to allow or deny the process from executing.

Returning to FIG. 7, at step 708 in FIG. 7 an action-taken report may be transmitted to the server. For example, database-update module 116 in FIG. 1 on client 202 in FIG. 2 may communicate an action-taken report to server 206 indicating whether the process was allowed to execute.

The phrase "action-taken report," as used herein, generally refers to any communication from client 202 in FIG. 2 to server 206 that may contain recommendations about the malicious nature of a process. FIG. 11 is a block diagram that illustrates at least one embodiment of an action-taken report. In this example, action-taken report 1100 contains information for three processes: 1102, 1104, and 1106. In one embodiment, process 1102 may represent a process for which database-update module 116 in FIG. 1 on client 202 in FIG. 2 may recommend adding it's process-name (as identified by process-name-identification module 106 in FIG. 1) to process-name database 122 and it's process-execution location (as identified by process-execution-location module 110) to acceptable-execution-location database 124. In an additional embodiment, process 1104 in FIG. 11 may represent a process for which database-update module 116 in FIG. 1 on client 202 in FIG. 2 may recommend adding its process-name (as identified by process-name-identification module 106 in FIG. 1) to process-name database 122. In a further embodiment, process 1106 in FIG. 11 may represent a process for which database-update module 116 in FIG. 1 on client 202 in FIG. 2 may recommend against adding its process-name to process-name database 122 in FIG. 1 and its process-execution location to acceptable-execution-location database 124.

Returning to FIG. 7, in an additional embodiment, the action-taken report transmitted from client 202 in FIG. 2 to server 206 in step 708 in FIG. 7 may be a report of whether the procedure was allowed to execute. In a further embodiment, client 202 in FIG. 2 may periodically transmit a copy of process-name database 122 in FIG. 1 and acceptable-execution-location 124 to server 206 in FIG. 2.

Figure 12:
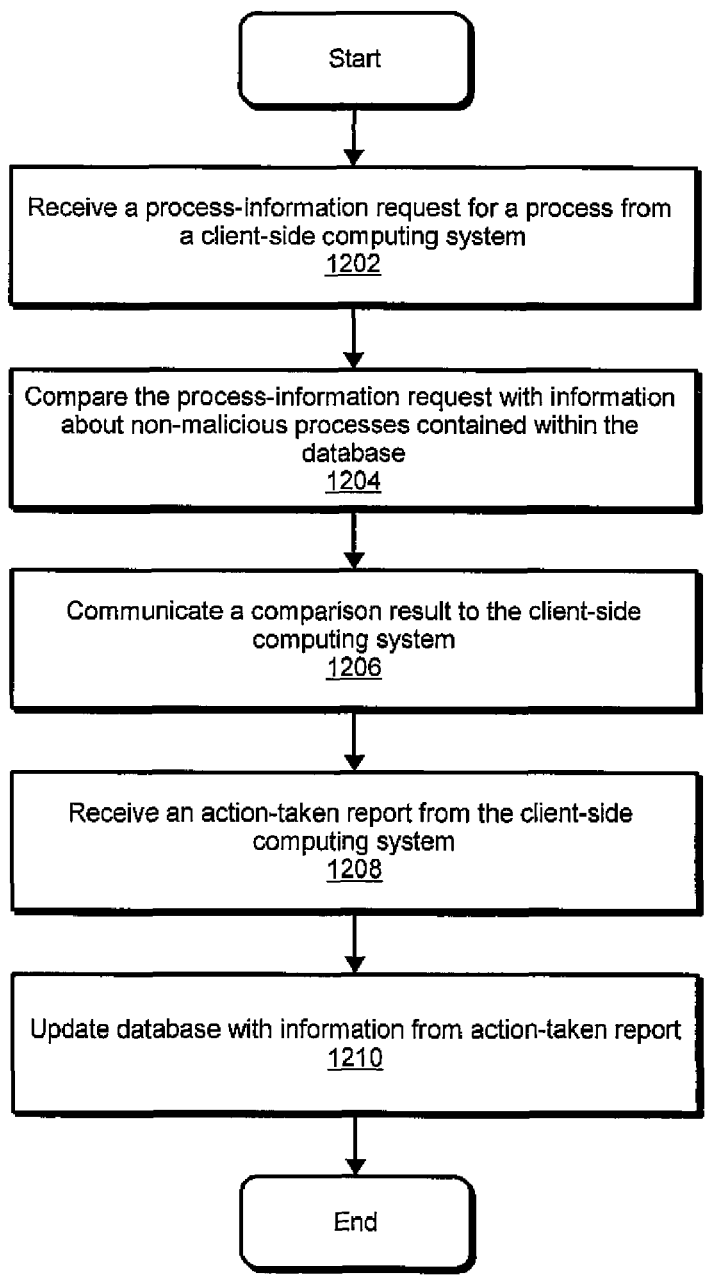
FIG. 12 is a flow diagram of an exemplary computer-implemented method for determining whether to allow a process to execute according to at least one embodiment.

FIG. 12 is a flow diagram of an exemplary computer-implemented method 1200 in which server 206 in FIG. 2 may receive and communicate process-information to client 202 for determining whether to allow a process to execute. As illustrated in this figure, at step 1202 in FIG. 12 a process-information request for a process may be received from a client-side computing system. For example, server 206 in FIG. 2 may receive a process-information request for a particular process from client 202. In another embodiment, server 206 may receive process-information requests from a plurality of computing systems that operate similarly to client 202.

At step 1204 in FIG. 12, the information contained in the process information request may be compared with information about non-malicious processes contained within databases 120 in FIG. 1. For example, process-name-comparison module 108 on server 206 in FIG. 2 may compare the process name contained in the process-information request with at least one process name contained in process-name database 122 in FIG. 1 on server 206 in FIG. 2. In another example, execution-location-comparison module 112 in FIG. 1 on server 206 in FIG. 2 may compare the process-execution location with at least one process-execution location contained in acceptable-execution-location database 124 in FIG. 1 associated with the process name in process-name database 122 on server 206 in FIG. 2.

At step 1206 in FIG. 12, a comparison result may be communicated to the client-side computing system. For example, server 206 in FIG. 2 may communicate the comparison result produced by process-name-comparison module 108 in FIG. 1 and execution-location-comparison module 112 on server 206 in FIG. 2 to client 202 over network 204.

The phrase "comparison result," as used herein, generally refers to data that may help client 202 in FIG. 2 determine whether to allow a process to execute. Such data may be produced by comparing the information contained in the process-information request in step 1202 in FIG. 12 with the data contained in process-name database 122 in FIG. 1 and acceptable-execution-location database 124. FIG. 10 is a block diagram that illustrates possible comparison results for processes 1002, 1004, 1006, and 1008. In this example, process-name-comparison module 108 in FIG. 1 may provide information that may be used by client 202 to determine whether process 1002 in FIG. 10 is an exact match, an inexact match, or a non-match. In another example, in process 1004, execution-location-comparison module 112 in FIG. 1 provides the necessary information to be transmitted to client 202 in FIG. 2 to determine whether process 1004 in FIG. 10 is attempting to execute in an acceptable-execution location contained in acceptable-execution-location database 124 in FIG. 1.

For process 1006 in FIG. 10, process-name-comparison module 108 in FIG. 1 may provide information that may be used by client 202 in FIG. 2 to determine whether process 1006 in FIG. 10 is an exact match, an inexact match, or a non-match. In a further example, both process-name-comparison module 108 in FIG. 1 and execution-location-comparison module 112 may generate information that may be used by client 202 in FIG. 2 to determine if process 1008 in FIG. 10 is a non-malicious process. In certain embodiments, the comparison result may be a determination by execution-determination module 114 in FIG. 1 on server 206 in FIG. 2 on whether to allow or deny the execution of the process on client 202.

At step 1208 in FIG. 12, an action-taken report from the client-side computing system may be received. For example, database-update module 116 in FIG. 1 on server 206 in FIG. 2 may receive an action-taken report from client 202. At step 1210 in FIG. 12, the database may be updated with information from the action-taken report. For example, database-update module 116 in FIG. 1 on server 206 in FIG. 2 may use the recommendation contained in an action-taken report received from client 202 to determine whether certain process names should be added to process-name database 122 in FIG. 1. Also, database-update module 116 on server 206 in FIG. 2 may use the recommendations contained in the action-taken report to determine whether the process-execution locations should be added to the acceptable-execution location. Database-update module may add process names and process-execution locations to the process-name database 122 in FIG. 1 and the acceptable-execution-location database 124 after a process has been recommended for addition from a plurality of computing systems. Upon completion of step 1210, exemplary method 1200 may terminate.

Figure 13:
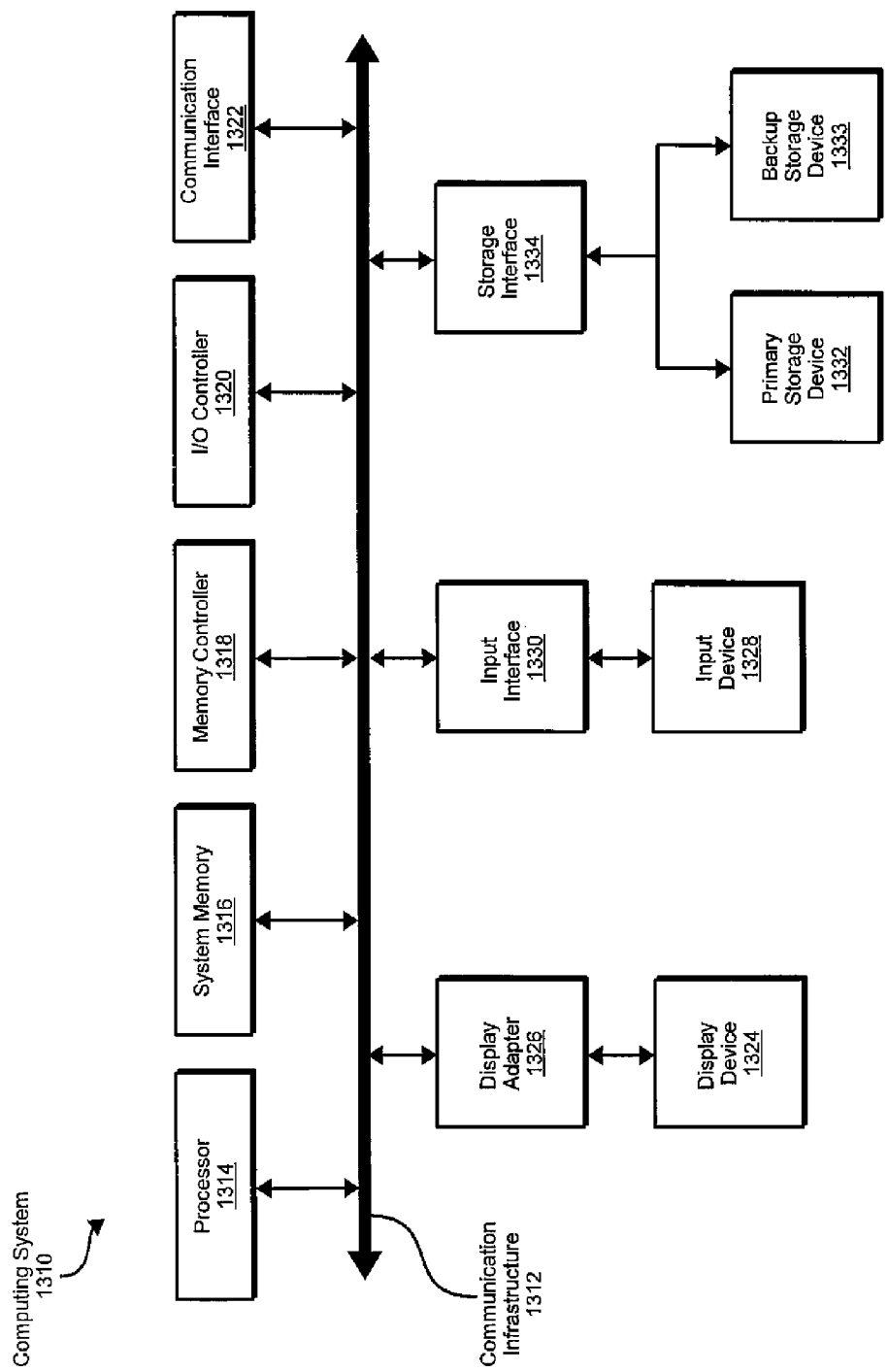
FIG. 13 is a block diagram of an exemplary computing system capable of implementing one or more of the embodiments described and/or illustrated herein.

FIG. 13 is a block diagram of an exemplary computing system 1310 capable of implementing one or more of the embodiments described and/or illustrated herein. Computing system 1310 broadly represents any single or multi-processor computing device or system capable of executing computer-readable instructions. Examples of computing system 1310 include, without limitation, workstations, laptops, client-side terminals, servers, distributed computing systems, handheld devices, or any other computing system or device. In its most basic configuration, computing system 1310 may comprise at least one processor 1314 and a system memory 1316.

Processor 1314 generally represents any type or form of processing unit capable of processing data or interpreting and executing instructions. In certain embodiments, processor 1314 may receive instructions from a software application or module. These instructions may cause processor 1314 to perform the functions of one or more of the exemplary embodiments described and/or illustrated herein. For example, processor 1314 may perform and/or be a means for performing, either alone or in combination with other elements, one or more of the identifying, determining, transmitting, receiving, prompting, comparing, finding, displaying, asking, receiving, comparing, communicating, and updating steps described herein. Processor 1314 may also perform and/or be a means for performing any other steps, methods, or processes described and/or illustrated herein.

System memory 1316 generally represents any type or form of volatile or non-volatile storage device or medium capable of storing data and/or other computer-readable instructions. Examples of system memory 1316 include, without limitation, random access memory (RAM), read only memory (ROM), flash memory, or any other suitable memory device. Although not required, in certain embodiments computing system 1310 may comprise both a volatile memory unit (such as, for example, system memory 1316) and a non-volatile storage device (such as, for example, primary storage device 1332, as described in detail below).

In certain embodiments, exemplary computing system 1310 may also comprise one or more components or elements in addition to processor 1314 and system memory 1316. For example, as illustrated in FIG. 13, computing system 1310 may comprise a memory controller 1318, an Input/Output (I/O) controller 1320, and a communication interface 1322, each of which may be interconnected via a communication infrastructure 1312. Communication infrastructure 1312 generally represents any type or form of infrastructure capable of facilitating communication between one or more components of a computing device. Examples of communication infrastructure 1312 include, without limitation, a communication bus (such as an ISA, PCI, PCIe, or similar bus) and a network.

Memory controller 1318 generally represents any type or form of device capable of handling memory or data or controlling communication between one or more components of computing system 1310. For example, in certain embodiments memory controller 1318 may control communication between processor 1314, system memory 1316, and I/O controller 1320 via communication infrastructure 1312. In certain embodiments, memory controller 1318 may perform and/or be a means for performing, either alone or in combination with other elements, one or more of the steps or features described and/or illustrated herein, such as identifying, determining, transmitting, receiving, prompting, comparing, finding, displaying, asking, receiving, comparing, communicating, and updating.

I/O controller 1320 generally represents any type or form of module capable of coordinating and/or controlling the input and output functions of a computing device. For example, in certain embodiments I/O controller may control or facilitate transfer of data between one or more elements of computing system 1310, such as processor 1314, system memory 1316, communication interface 1322, display adapter 1326, input interface 1330, and storage interface 1334. I/O controller 1320 may be used, for example, to perform and/or be a means for performing, either alone or in combination with other elements, one or more of the identifying, determining, transmitting, receiving, prompting, comparing, finding, displaying, asking, receiving, comparing, communicating, and updating steps described herein. I/O controller 1320 may also be used to perform and/or be a means for performing other steps and features set forth in the instant disclosure.

Communication interface 1322 broadly represents any type or form of communication device or adapter capable of facilitating communication between exemplary computing system 1310 and one or more additional devices. For example, in certain embodiments communication interface 1322 may facilitate communication between computing system 1310 and a private or public network comprising additional computing systems. Examples of communication interface 1322 include, without limitation, a wired network interface (such as a network interface card), a wireless network interface (such as a wireless network interface card), a modem, and any other suitable interface. In at least one embodiment, communication interface 1322 may provide a direct connection to a remote server via a direct link to a network, such as the Internet. Communication interface 1322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1322 may also represent a host adapter configured to facilitate communication between computing system 1310 and one or more additional network or storage devices via an external bus or communications channel. Examples of host adapters include, without limitation, SCSI host adapters, USB host adapters, IEEE 1394 host adapters, SATA and eSATA host adapters, ATA and TATA host adapters, Fibre Channel interface adapters, Ethernet adapters, or the like. Communication interface 1322 may also allow computing system 1310 to engage in distributed or remote computing. For example, communication interface 1322 may receive instructions from a remote device or send instructions to a remote device for execution. In certain embodiments, communication interface 1322 may perform and/or be a means for performing, either alone or in combination with other elements, one or more of the identifying, determining, transmitting, receiving, prompting, comparing, finding, displaying, asking, receiving, comparing, communicating, and updating steps disclosed herein. Communication interface 1322 may also be used to perform and/or be a means for performing other steps and features set forth in the instant disclosure.

As illustrated in FIG. 13, computing system 1310 may also comprise at least one display device 1324 coupled to communication infrastructure 1312 via a display adapter 1326. Display device 1324 generally represents any type or form of device capable of visually displaying information forwarded by display adapter 1326. Similarly, display adapter 1326 generally represents any type or form of device configured to forward graphics, text, and other data from communication infrastructure 1312 (or from a frame buffer, as known in the art) for display on display device 1324.

As illustrated in FIG. 13, exemplary computing system 1310 may also comprise at least one input device 1328 coupled to communication infrastructure 1312 via an input interface 1330. Input device 1328 generally represents any type or form of input device capable of providing input, either computer or human generated, to exemplary computing system 1310. Examples of input device 1328 include, without limitation, a keyboard, a pointing device, a speech recognition device, or any other input device. In at least one embodiment, input device 1328 may perform and/or be a means for performing, either alone or in combination with other elements, one or more of the identifying, determining, transmitting, receiving, prompting, comparing, finding, displaying, asking, receiving, comparing, communicating, and updating steps disclosed herein. Input device 1328 may also be used to perform and/or be a means for performing other steps and features set forth in the instant disclosure.

As illustrated in FIG. 13, exemplary computing system 1310 may also comprise a primary storage device 1332 and a backup storage device 1333 coupled to communication infrastructure 1312 via a storage interface 1334. Storage devices 1332 and 1333 generally represent any type or form of storage device or medium capable of storing data and/or other computer-readable instructions. For example, storage devices 1332 and 1333 may be a magnetic disk drive (e.g., a so-called hard drive), a floppy disk drive, a magnetic tape drive, an optical disk drive, a flash drive, or the like. Storage interface 1334 generally represents any type or form of interface or device for transferring data between storage devices 1332 and 1333 and other components of computing system 1310.

In certain embodiments, storage devices 1332 and 1333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1332 and 1333 may also comprise other similar structures or devices for allowing computer software, data, or other computer-readable instructions to be loaded into computing system 1310. For example, storage devices 1332 and 1333 may be configured to read and write software, data, or other computer-readable information. Storage devices 1332 and 1333 may also be a part of computing system 1310 or may be a separate device accessed through other interface systems.

In certain embodiments, the exemplary file systems disclosed herein may be stored on primary storage device 1332, while the exemplary file-system backups disclosed herein may be stored on backup storage device 1333. Storage devices 1332 and 1333 may also be used, for example, to perform and/or be a means for performing, either alone or in combination with other elements, one or more of the identifying, determining, transmitting, receiving, prompting, comparing, finding, displaying, asking, receiving, comparing, communicating, and updating steps disclosed herein. Storage devices 1332 and 1333 may also be used to perform and/or be a means for performing other steps and features set forth in the instant disclosure.

Many other devices or subsystems may be connected to computing system 1310. Conversely, all of the components and devices illustrated in FIG. 13 need not be present to practice the embodiments described and/or illustrated herein. The devices and subsystems referenced above may also be interconnected in different ways from that shown in FIG. 13. Computing system 1310 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1310. All or a portion of the computer program stored on the computer-readable medium may then be stored in system memory 1316 and/or various portions of storage devices 1332 and 1333. When executed by processor 1314, a computer program loaded into computing system 1310 may cause processor 1314 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1310 may be configured as an application specific integrated circuit (ASIC) adapted to implement one or more of the exemplary embodiments disclosed herein.

Figure 14:
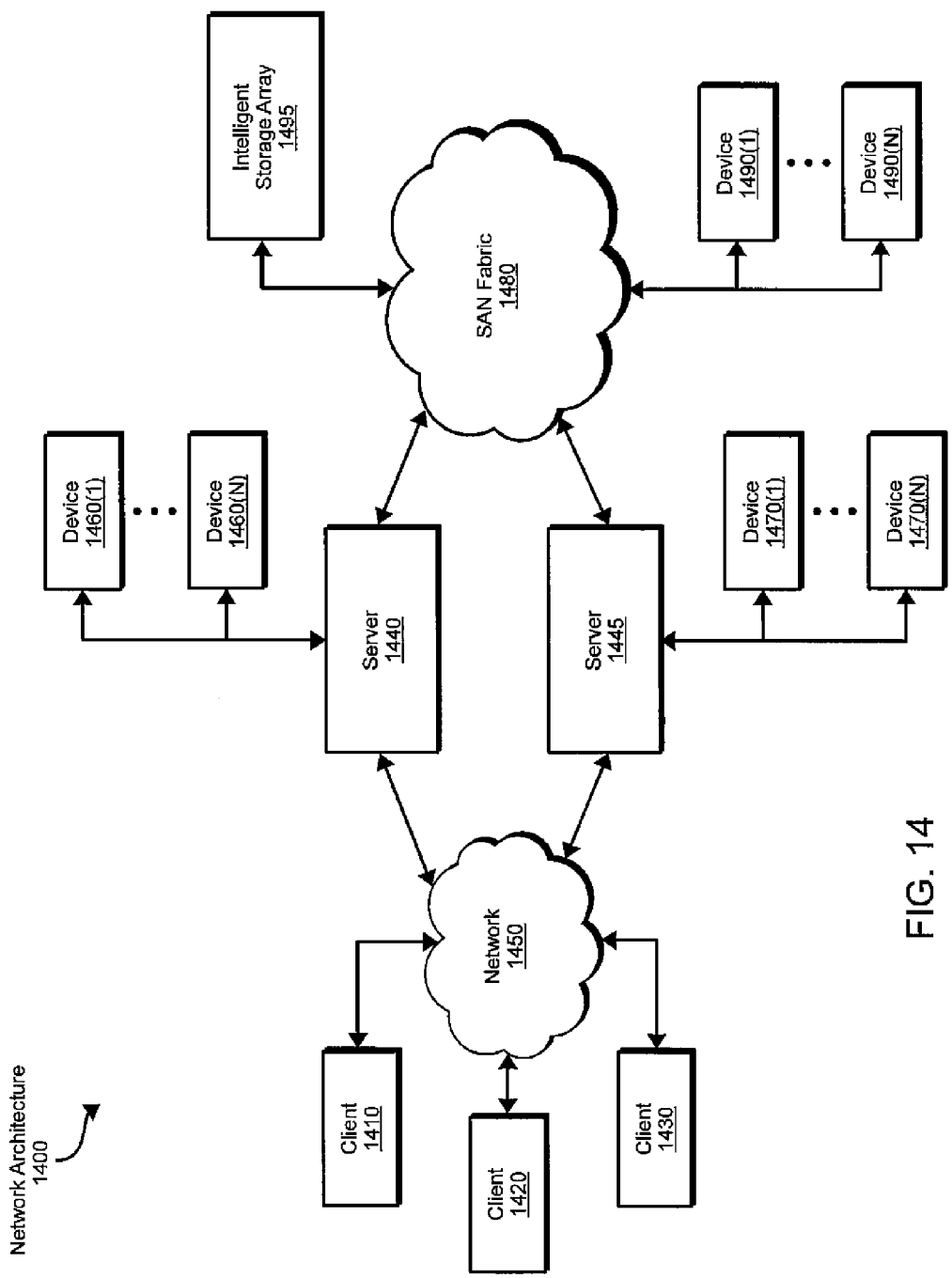
FIG. 14 is a block diagram of an exemplary computing network capable of implementing one or more of the embodiments described and/or illustrated herein.

FIG. 14 is a block diagram of an exemplary network architecture 1400 in which client systems 1410, 1420, and 1430 and servers 1440 and 1445 may be coupled to a network 1450. Client systems 1410, 1420, and 1430 generally represent any type or form of computing device or system, such as exemplary computing system 1310 in FIG. 13. Similarly, servers 1440 and 1445 generally represent computing devices or systems, such as application servers or database servers, configured to provide various database services and/or to run certain software applications. Network 1450 generally represents any telecommunication or computer network; including, for example, an intranet, a wide area network (WAN), a local area network (LAN), a personal area network (PAN), or the Internet.

As illustrated in FIG. 14, one or more storage devices 1460(1)-(N) may be directly attached to server 1440. Similarly, one or more storage devices 1470(1)-(N) may be directly attached to server 1445. Storage devices 1460(1)-(N) and storage devices 1470(1)-(N) generally represent any type or form of storage device or medium capable of storing data and/or other computer-readable instructions. In certain embodiments, storage devices 1460(1)-(N) and storage devices 1470(1)-(N) may represent network-attached storage (NAS) devices configured to communicate with servers 1440 and 1445 using various protocols, such as NFS, SMB, or CIFS.

Servers 1440 and 1445 may also be connected to a storage area network (SAN) fabric 1480. SAN fabric 1480 generally represents any type or form of computer network or architecture capable of facilitating communication between a plurality of storage devices. SAN fabric 1480 may facilitate communication between servers 1440 and 1445 and a plurality of storage devices 1490(1)-(N) and/or an intelligent storage array 1495. SAN fabric 1480 may also facilitate, via network 1450 and servers 1440 and 1445, communication between client systems 1410, 1420, and 1430 and storage devices 1490(1)-(N) and/or intelligent storage array 1495 in such a manner that devices 1490(1)-(N) and array 1495 appear as locally attached devices to client systems 1410, 1420, and 1430. As with storage devices 1460(1)-(N) and storage devices 1470(1)-(N), storage devices 1490(1)-(N) and intelligent storage array 1495 generally represent any type or form of storage device or medium capable of storing data and/or other computer-readable instructions.

In certain embodiments, and with reference to exemplary computing system 1310 of FIG. 13, a communication interface, such as communication interface 1322 in FIG. 13, may be used to provide connectivity between each client system 1410, 1420, and 1430 and network 1450. Client systems 1410, 1420, and 1430 may be able to access information on server 1440 or 1445 using, for example, a web browser or other client software. Such software may allow client systems 1410, 1420, and 1430 to access data hosted by server 1440, server 1445, storage devices 1460(1)-(N), storage devices 1470(1)-(N), storage devices 1490(1)-(N), or intelligent storage array 1495. Although FIG. 14 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1440, server 1445, storage devices 1460(1)-(N), storage devices 1470(1)-(N), storage devices 1490(1)-(N), intelligent storage array 1495, or any combination thereof. All or a portion of one or more of the exemplary embodiments disclosed herein may also be encoded as a computer program, stored in server 1440, run by server 1445, and distributed to client systems 1410, 1420, and 1430 over network 1450. Accordingly, network architecture 1400 may perform and/or be a means for performing, either alone or in combination with other elements, one or more of the identifying, determining, transmitting, receiving, prompting, comparing, finding, displaying, asking, receiving, comparing, communicating, and updating steps disclosed herein. Network architecture 1400 may also be used to perform and/or be a means for performing other steps and features set forth in the instant disclosure.

As detailed above, computing system 1310 and/or one or more of the components of network architecture 1400 may perform and/or be a means for performing, either alone or in combination with other elements, one or more steps of the exemplary methods described and/or illustrated herein. For example, a computer-implemented method for detecting a malicious process by analyzing process names may comprise identifying a process, identifying a process name for the process, identifying a list of process names for non-malicious processes, and determining, by comparing the process name for the process with the list of process names for non-malicious processes, whether to allow the process to execute.

In certain embodiments, the list of process names for non-malicious processes is maintained on a client-side computing system. In an alternative embodiment, the list of process names for non-malicious processes is maintained on a server wherein detecting a malicious process by analyzing process names further comprises transmitting, from a client-side computing system, a process-information request, receiving a response from the server, and determining, based on the response received from the server, whether to allow the process to execute.

In a further embodiment, detecting a malicious process by analyzing process names further comprises transmitting to the server an action-taken report, wherein the action taken report comprises at least one of the process names for the process, an indication of whether the process was allowed to execute, a recommendation on whether to add the process name to the list of process names for non-malicious processes, a process-execution location from which the process was attempting to execute, and a recommendation on whether to add the process-execution location to the list of process names for non-malicious processes.

The list of process names for non-malicious processes may comprise a process-names index containing names of non-malicious processes and an acceptable-location index containing file locations for non-malicious processes. Comparing the process name for the process with the list of process names for non-malicious processes may comprise identifying an exact match and identifying an inexact match. Determining whether to allow the process to execute may comprise prompting a user to allow or deny the process from executing and/or automatically determining whether to allow the process to execute.

In certain embodiments, detecting a malicious process by analyzing process names and process-execution locations may comprise identifying a process-execution location, exactly matching the process name to a name in the list of process names for non-malicious processes, comparing the location with the acceptable-location index in the list of process names for non-malicious processes, and determining whether to allow the process to execute.

Identifying an inexact match may comprise computing a similarity metric between the process name and at least one process name in the list of process names for non-malicious processes and finding at least one process name in the list of process names for non-malicious processes where the similarity metric is within an inexact-match-metric range.

In certain embodiments, prompting the user to allow or deny the process from executing may comprise displaying a process-execution location, displaying a number of letter transformations necessary to transform the process name into at least one process name in the list of process names for non-malicious processes, displaying the process name, asking the user to deny or allow the process to execute, asking the user to add the process-execution location to the list of process names for non-malicious processes, and asking the user to add the process name to the list of process names for non-malicious processes.

In certain embodiments, automatically determining whether to allow the process to execute may comprise identifying an inexact match for the process name, identifying an exact match for the process name, identifying a process-execution location for the process, determining whether to allow the process based on the inexact match, determining whether to allow the process to execute based on the process-execution location, identifying a digital signature associated with the process, updating the list of process names for non-malicious processes with the process name, and updating the list of process names for non-malicious processes with the process-execution location.

A computer-implemented method for maintaining a database containing information about non-malicious process may comprise receiving a process-information request for a process from a client-side computing system, comparing the process-information request received from the client-side computing system with the information about non-malicious processes contained within the database, and communicating a comparison result to the client-side computing system.

The database may comprise a process-names index containing names of non-malicious processes and an acceptable-location index containing file locations for non-malicious processes. The process-information request may comprise a process name, a process-execution location, and a digital signature.

The comparison result may comprise an indication as to whether the process name is an exact match, an indication as to whether the process name is an inexact match, and an indication as to whether the process-execution location is found in the acceptable-location index. The indication as to whether the process name is an inexact match may comprise computing a similarity metric between the process name and at least one process name in the database, and finding at least one process name in database where the similarity metric is within an inexact-match-metric range.

In certain embodiments, maintaining a database containing information about non-malicious processes may comprise receiving an action-taken report from the client-side computing system, and updating the database based on information contained in the action-taken report. The action taken report may comprise the process name for the process, an indication as to whether the process was allowed to execute, and a recommendation as to whether the process name should be added to the database.

A computer readable medium may comprise one or more computer-executable instruction that, when executed by a computing device, cause the computing device to identify a process, identify a process name for the process, identify a process-execution location for the process, and determine whether the process should be allowed to execute.

What is claimed is:

1. A computer-implemented method for detecting malicious processes based at least in part on an analysis of process names, the method comprising:
   identifying a process;
   identifying a process name for the process;
   identifying a list of known non-malicious processes, wherein the list of known non-malicious processes identifies, for each non-malicious process within the list, at least one of:
      at least one process name associated with the non-malicious process;
      at least one acceptable file location from which the non-malicious process may execute;
   determining, at least in part by comparing the process name for the process with the list of known non-malicious processes, that the process represents an attempt to mimic a process name of at least one known non-malicious process;
   determining, based on the determination that the process represents an attempt to mimic the process name of at least one known non-malicious process, that the process represents a security risk;
   preventing the process from executing;
   wherein at least a portion of the method is performed by a computing device comprising at least one processor.

2. The method of claim 1, wherein the list of known non-malicious processes is maintained on a client-side computing system.

3. The method of claim 1, wherein the list of known non-malicious processes is maintained on a server.

4. The method of claim 3, wherein determining that the process represents a security risk comprises:
   transmitting, from a client-side computing system, a process-information request that identifies the process;
   receiving a response to the process-information request from the server;
   determining, based at least in part on the response received from the server, that the process represents a security risk.

5. The method of claim 4, further comprising transmitting to the server an action-taken report, the action-taken report comprising at least one of:
   the process name for the process;
   an indication that the process was prevented from executing;
   a file location associated with the process.

6. The method of claim 1, wherein determining that the process represents an attempt to mimic the process name of at least one known non-malicious process comprises at least one of:
   determining that the process name of the process is similar to the process name of at least one known non-malicious process identified within the list of known non-malicious processes;
   determining that the process name of the process exactly matches the process name of at least one known non-malicious process identified within the list of known non-malicious processes, but that the process is attempting to execute from an unacceptable file location.

7. The method of claim 6, wherein determining that the process name of the process is similar to the process name of at least one known non-malicious process identified within the list of known non-malicious processes comprises:

computing a similarity metric between the process name of the process and at least one process name identified within the list of known non-malicious processes;

identifying at least one process name within the list of known non-malicious processes having a similarity metric with respect to the process name of the process that falls within a predefined inexact-match-metric range.

8. The method of claim 6, wherein determining that the process name of the process exactly matches the process name of at least one known non-malicious process identified within the list of known non-malicious processes, but that the process is attempting to execute from an unacceptable file location comprises:

identifying an exact match for the process name of the process within the list of known non-malicious processes;

identifying, within the list of known non-malicious processes, at least one acceptable file location associated with the exact match;

determining that a file location associated with the process is different from each acceptable file location associated with the exact match.

9. The method of claim 1, wherein determining that the process represents a security risk comprises at least one of:

receiving an instruction from a user to prevent the process from executing;

automatically determining that the process represents a security risk.

10. The method of claim 9, further comprising, prior to receiving the instruction from the user, prompting the user to allow or deny the process from executing by at least one of:

displaying a file location associated with the process;

displaying a number of letter transformations necessary to transform the process name into at least one process name identified within the list of known non-malicious processes;

displaying the process name of the process;

asking the user to deny or allow the process to execute;

asking the user to add the file location associated with the process to the list of known non-malicious processes;

asking the user to add the process name of the process to the list of known non-malicious processes.

11. A computer-implemented method for maintaining a database containing information about known non-malicious processes, the method comprising:

receiving a process-information request from a client-side computing system, wherein the process-information request identifies at least one process;

identifying a database that contains information about known non-malicious processes, wherein the database identifies, for each non-malicious process within the database, at least one of:

at least one process name associated with the non-malicious process;

at least one acceptable file location from which the non-malicious process may execute;

determining, by comparing information contained within the process-information request received from the client-side computing system with the information about known non-malicious processes contained within the database, that the process identified in the process-information request represents an attempt to mimic a process name of at least one known non-malicious process;

providing an indication to the client-side computing system that the process represents an attempt to mimic the process name of at least one known non-malicious process in order to enable the client-side computing system to determine whether the process represents a security risk.

12. The method of claim 11, wherein the process-information request comprises at least one of:

a process name for the process;

a file location associated with the process;

a digital signature associated with the process.

13. The method of claim 11, wherein determining that the process represents an attempt to mimic the process name of at least one known non-malicious process comprises at least one of:

determining that a process name of the process is similar to the process name of at least one known non-malicious process identified within the database;

determining that the process name of the process exactly matches the process name of at least one known non-malicious process identified within the database, but that a file location associated with the process represents an unacceptable file location.

14. The method of claim 13, wherein determining that the process name of the process is similar to the process name of at least one known non-malicious process identified within the database comprises:

computing a similarity metric between the process name of the process and at least one process name in the database;

identifying at least one process name in the database having a similarity metric with respect to the process name of the process that falls within a predefined inexact-match-metric range.

15. The method of claim 11, further comprising:

receiving an action-taken report from the client-side computing system;

updating the database based on information contained in the action-taken report.

16. The method of claim 15, wherein the action-taken report comprises at least one of:

a process name for the process;

a file location associated with the process;

an indication as to whether the process was allowed to execute;

a recommendation as to whether the process name should be added to the database;

a recommendation as to whether the file location associated with the process should be added to the database as an acceptable file location.

17. A non-transitory computer-readable medium comprising one or more computer-executable instructions that, when executed by a computing device, cause the computing device to:

identify a process;

identify a process name for the process;

identify a list of known non-malicious processes, wherein the list of known non-malicious processes identifies, for each non-malicious process within the list, at least one of:

at least one process name associated with the non-malicious process;

at least one acceptable file location from which the non-malicious process may execute;

determine, at least in part by comparing the process name for the process with the list of known non-malicious processes, that the process represents an attempt to mimic a process name of at least one known non-malicious process;

determine, based on the determination that the process represents an attempt to mimic the process name of at least one known non-malicious process, that the process represents a security risk;

prevent the process from executing.

18. The method of claim 13, wherein determining that the process name of the process exactly matches the process name of at least one known non-malicious process identified within the database, but that a file location associated with the process represents an unacceptable file location comprises:

identifying an exact match for the process name of the process within the database;

identifying, within the database, at least one acceptable file location associated with the exact match;

determining that the file location associated with the process is different from each acceptable file location associated with the exact match.

\* \* \* \* \*